(12) United States Patent
Pan et al.

(10) Patent No.: US 10,000,583 B2
(45) Date of Patent: *Jun. 19, 2018

(54) NANO-SIZED HYDROGENATED DIENE-BASED LATEX PARTICLES

(75) Inventors: Qinmin Pan, Waterloo (CA); Garry L. Rempel, Waterloo (CA)

(73) Assignee: UNIVERSITY OF WATERLOO, Waterloo (CA)

(*) Notice: Subject to any disclaimer, the term of this patent is extended or adjusted under 35 U.S.C. 154(b) by 1155 days.

This patent is subject to a terminal disclaimer.

(21) Appl. No.: 13/392,118

(22) PCT Filed: Aug. 26, 2010

(86) PCT No.: PCT/IB2010/053842
§ 371 (c)(1),
(2), (4) Date: Jul. 6, 2012

(87) PCT Pub. No.: WO2011/024139
PCT Pub. Date: Mar. 3, 2011

(65) Prior Publication Data
US 2012/0270996 A1    Oct. 25, 2012

(51) Int. Cl.
*C08C 19/02* (2006.01)
*C08L 9/04* (2006.01)
*C08L 15/00* (2006.01)

(52) U.S. Cl.
CPC ............... *C08C 19/02* (2013.01); *C08L 9/04* (2013.01); *C08L 15/005* (2013.01); *Y10T 428/2982* (2015.01)

(58) Field of Classification Search
CPC .......... C08L 15/005; C08L 9/04; C08C 19/02; Y10T 428/2982
See application file for complete search history.

(56) References Cited

U.S. PATENT DOCUMENTS

| 3,454,644 A | 7/1969 | Dewhirst |
| 3,690,349 A | 9/1972 | Donche-Gay |
| 4,452,950 A | 6/1984 | Wideman |
| 4,508,862 A | 4/1985 | Schmidt |
| 5,039,737 A | 8/1991 | Parker et al. |
| 5,057,581 A | 10/1991 | Rempel et al. |
| 5,082,732 A | 1/1992 | Ueda et al. |
| 5,272,202 A | 12/1993 | Kubo et al. |
| 5,442,009 A | 8/1995 | Parker et al. |
| 5,651,995 A | 7/1997 | Oyama et al. |
| 5,705,571 A | 1/1998 | Tsiang et al. |
| 5,770,660 A | 6/1998 | Lightsey |
| 6,020,439 A | 2/2000 | Ko et al. |
| 6,410,657 B1 | 6/2002 | Ko et al. |
| 6,552,132 B2 | 4/2003 | Belt et al. |
| 6,635,718 B2 | 10/2003 | Belt et al. |
| 7,345,115 B2 | 3/2008 | Rempel |
| 7,385,010 B2 | 6/2008 | Rempel et al. |
| 2006/0211827 A1 | 9/2006 | Rempel et al. |

OTHER PUBLICATIONS

Lat. .Am. appl. res. v.33 n. 2 Bahla Blanca Apr./Jun. 2003—"Emulsion copolymerization of acrylonitrile and butadiene in an industrial reactor. Madlematical modeling,estimation, and control of polymer quality variablea on the basis of calorimetric meaurements" J.R.Vega et al.*
Qinmin, P. Applied Catalysis A: General 276 , (2004), pp. 122-128.
Qinmin, P. Journal of Applied Polymer Science, vol. 96. (2005), p. 1122-1125.
International Search Report from co-pending Application PCT/1B2010/053842, dated Nov. 25, 2010, 2 pages.

* cited by examiner

*Primary Examiner* — Peter D. Mulcahy

(57) ABSTRACT

The present invention relates to diene-based hydrogenated polymer latex particles having a particle size measured as $d_{90}$ value of less than 60 nm and a method for their production and their use. The nanosized hydrogenated diene-based polymers obtained show improved properties, especially with respect to resistance to degradation by heat, oxygen and ozone.

18 Claims, No Drawings

NANO-SIZED HYDROGENATED DIENE-BASED LATEX PARTICLES

FIELD OF THE INVENTION

The invention relates to nano-sized hydrogenated diene-based latex particles, a method for producing such particles and methods of using them as rubber.

BACKGROUND OF THE INVENTION

Diene-based unsaturated polymers, for example nitrile butadiene rubbers, also known as NBR, produced through polymerization of acrylonitrile and butadiene are well-known in the art. Processes for copolymerization of acrylonitrile and butadiene are described for example in U.S. Pat. No. 3,690,349 and U.S. Pat. No. 5,770,660. Depending on production conditions such polymers can be obtained as latex in aqueous medium. Unsaturated diene-based polymers such as NBR are used for a variety of purposes in industry, moreover processes for hydrogenating such unsaturated polymers are well-known in the art.

It has been known that carbon-carbon double bonds in diene-based polymers may be selectively hydrogenated by treating the polymer in an organic solution with hydrogen in the presence of a catalyst to produce their saturated polymers which have significantly improved end-use properties. Such processes can be selective in the double bonds which are hydrogenated so that, for example, the double bonds in aromatic or naphthenic groups are not hydrogenated and double or triple bonds between carbon and other atoms such as nitrogen or oxygen are not affected. This field of art contains many examples of catalysts suitable for such hydrogenations, including catalysts based on cobalt, nickel, rhodium, ruthenium, osmium, and iridium. The suitability of the catalyst depends on the extent of hydrogenation required, the rate of the hydrogenation reaction and the presence or absence of other groups, such as carboxyl and nitrile groups, in the polymers.

Hydrogenation of diene-based polymers has been very successful, if organometallic catalysts or some special metal salt catalysts and high-pressure gaseous hydrogen are used. Such success has been realized in solution hydrogenation, bulk hydrogenation and direct latex hydrogenation. For the solution hydrogenation of a diene-based polymer, the polymer is first dissolved in an organic solvent and then hydrogenation is carried out; after the hydrogenation, post-treatment is applied to recycle the organic solvent and to recover the metal catalyst. In this field, there have been already many patents and patent applications filed in this area, such as U.S. Pat. No. 6,410,657, U.S. Pat. No. 6,020,439, U.S. Pat. No. 5,705,571, U.S. Pat. No. 5,057,581, and U.S. Pat. No. 3,454,644.

In direct latex hydrogenation, a catalyst is directly added into the latex of a diene-based polymer for the hydrogenation operation. Many diene based polymers, copolymers or terpolymers are made by emulsion polymerization processes and they are in a latex form when they are discharged from polymerization reactors. Therefore it is very desirable to directly hydrogenate a diene-based polymer in latex form which is receiving increasing attention in the recent decade. Many efforts have been made to realize such a process. U.S. Pat. No. 7,385,010 has disclosed a process of directly hydrogenating diene-based polymer latex by using organometallic catalysts and high-pressure gaseous hydrogen.

In bulk hydrogenation, a catalyst is directly mixed with a diene-based polymer or a catalyst is entrapped into the polymer, and then hydrogenation is applied. U.S. Pat. No. 7,345,115 teaches a process of using an organometallic catalyst and high-pressure gaseous hydrogen to hydrogenate bulk diene-based polymers at a temperature higher than 100° C., in which the polymer is directly mixed with the catalyst particles.

A significant characteristic of the above processes is that they all involve catalysts in which a noble metal is involved, that they all require high-pressure hydrogen and that they may need a relatively long reaction time.

To avoid using noble metals and avoid being operated under high-pressure, significant attention has been paid to the hydrogenation of C=C bonds using hydrazine or a derivative of hydrazine as a reducing agent together with an oxidant like oxygen, air or hydrogen peroxide. The hydrogen source to saturate the C=C bonds is then generated in-situ as a result of the redox reactions in which diimide is also formed as intermediate. In U.S. Pat. No. 4,452,950 the latex hydrogenation is performed using the hydrazine hydrate/hydrogen peroxide (or oxygen) redox system to produce diimide in situ. $CuSO_4$ or $FeSO_4$ is used as a catalyst. U.S. Pat. No. 5,039,737 and U.S. Pat. No. 5,442,009 provide a more refined latex hydrogenation process which treats the hydrogenated latex with ozone to break the cross-linked polymer chains which form during or after the latex hydrogenation using the diimide approach. U.S. Pat. No. 6,552,132 B2 discloses that a compound can be added before, during or after the latex hydrogenation to break crosslinks formed during the hydrogenation using the diimide hydrogenation route. The compound can be chosen from primary or secondary amines, hydroxylamine, imines, azines, hydrazones and oximes. U.S. Pat. No. 6,635,718 B2 describes the process for hydrogenating C=C bonds of an unsaturated polymer in the form of an aqueous dispersion by using hydrazine and an oxidizing compound in the presence of a metal compound containing a metal atom in an oxidation state of at least 4 (such as Ti(IV), V(V), Mo(VI) and W(VI)) as the catalyst. In Applied Catalysis A: General 276 (2004) 123-128 and Journal of Applied Polymer Science Vol. 96, (2005) 1122-1125 detailed investigations relating to the hydrogenation of nitrile butadiene rubber latex via utilization of the diimide hydrogenation route are presented which cover examining hydrogenation efficiency and degree of hydrogenation.

It has been found that there are side reactions at the interphase of the latex particles and within the polymer phase, which generate radicals to initiate the crosslinking of polymers in the latex form. Using radical scavengers did not show any evidence in helping to suppress the degree of gel formation. Although there are methods developed to reduce the crosslinking, the aforementioned diimide route still encounters gel formation problems, especially when high hydrogenation conversion is achieved. Therefore, the resulting hydrogenated rubber mass is difficult to process or is unsuitable for further use because of its macroscopic three dimensional cross-linked structure.

SUMMARY OF THE INVENTION

It was an object of the present invention to provide new diene-based hydrogenated polymers. A further object of the present invention was to provide processes for producing same hydrogenated polymers.

The present invention provides new nanosized diene-based hydrogenated polymer particles in latex form wherein the particles have a particle size measured as $d_{90}$-value of less than 60 nm, preferably less than 40 nm, more preferably less than 30 nm and most preferably less than 20 nm. In one embodiment the diene-based unsaturated polymer is an acrylonitrile/butadiene polymer.

Furthermore, the present invention provides a process for the selective hydrogenation of diene-based unsaturated polymer particles in latex form, comprising
   a) providing diene-based unsaturated polymer particles having a particle size measured as $d_{90}$-value of less than 60 nm
   b) combining the diene-based unsaturated polymer in latex form with hydrogen or a hydrogen-source in the presence of
   c) a transition metal containing catalyst and preferably
   d) maintaining a temperature of from about 35° C. to about 180° C., preferably from about 80° C. to about 160° C.

For the purposes of the present invention the $d_{90}$-diameter means that 90% of the particles have a diameter less than the value indicated.

For the purpose of the present invention selective hydrogenation preferably means the hydrogenation of carbon-carbon double bonds.

DETAILED DESCRIPTION OF THE INVENTION

I) Preparation of the Diene-Based Unsaturated Polymer Particles to be Hydrogenated According to the Present Invention.

The diene-based unsaturated polymer particles may be prepared as a latex by a method comprising
   a) polymerization of at least one diene D and optionally at least one copolymerizable monomer A
   b) in an aqueous medium, preferably water
   c) in the presence of a surfactant, preferably alkylsulfate, especially a Gemini surfactant, wherein
   d) diene D and optionally at least one copolymerizable monomer A are continuously preferably in slow and steady feeding rate charged into a reactor containing the aqueous medium, a polymerization initiator and the surfactant.

In one preferred embodiment the diene D and optionally monomer A are added continuously and slowly. The length of the addition period depends on reaction conditions, which in principle, does not allow the monomers D and A to be accumulated into droplets in the waster phase and usually is at least 10 minutes. In a further preferred embodiment an amount of less than 1% (in weight, based on the amount of water), preferably less than 0.1% (in weight, based on the amount of water) of unreacted diene D and optionally monomer A in the water phase in the reactor is maintained.

In a further preferred embodiment a small amount of a redox polymerization initiator is used, which is in the range of 0.0.5% to 5%, preferably 0.1%-1% in weight based on the total amount of the monomers. The term "diene D and optionally at least one copolymerisable monomer A are continuously charged into a reactor" means that not the complete nor almost the complete amount of reactants are put together into the reactor at the very beginning of the reaction. The term includes feeding the reactants with essentially the same feeding rate and concentration including increasing and decreasing such rates. Furthermore, the term includes addition of the reactants in small portions during the reaction.

The process is useful for the production of nanosize particles having a $d_{90}$-diameter of less than 60 nm.

The diene-based latex particles are based on at least one diene monomer, preferably at least one conjugated monomer D. The diene D can be of any nature. In one embodiment ($C_4$-$C_6$) conjugated dienes are used. Preference is given to 1,3-butadiene, isoprene, 1-methylbutadiene, 2,3-dimethylbutadiene, piperylene, chloroprene, or mixtures thereof. Particular preference is given to 1,3-butadiene and isoprene or mixtures thereof. Special preference is given to 1,3-butadiene.

Suitable copolymerizable monomers A include acrylonitrile, methacrylonitrile, styrene, alphamethyl styrene, propyl acrylate, butyl acrylate, propyl methacrylate, butyl methacrylate, and unsaturated carboxylic acids selected from fumaric acid, maleic acid, acrylic acid and methacrylic acid.

The conjugated diene D forms from about 15 to about 100% by weight of the carbon-carbon double bond containing polymer in the latex form. If copolymerizable monomers A are used and selected from styrene and alphamethyl styrene, the styrene and/or a methyl styrene monomer preferably forms from about 15 to about 60% by weight of the polymer. If the other copolymerizable monomers A are used and selected from acrylonitrile and methacrylonitrile, the acrylonitrile and/or methacrylonitrile monomer preferably forms from about 15 to about 50% by weight of the polymer, with the conjugated diolefin forming from about 50 to about 85% by weight of the polymer.

If other copolymerizable monomers A are used and selected from acrylonitrile and methacrylonitrile and additionally from an unsaturated carboxylic acid, the acrylonitrile or methacrylonitrile forms from about 15 to about 50% by weight of the polymer, the unsaturated carboxylic acid forms from about 1 to about 10% by weight of the polymer and the conjugated diolefin forms from about 40 to about 85% by weight of the polymer.

Preferred products include styrene-butadiene polymers of the random or block types, butadiene-acrylonitrile polymers and butadiene-acrylonitrile-methacrylic acid polymers. Preferred butadiene-acrylonitrile polymers have an acrylonitrile content of from about 25 to about 45% by weight.

A particularly suitable copolymer to be used is a nitrile rubber this being a copolymer of an $\alpha,\beta$-unsaturated nitrile, particularly preferred acrylonitrile, and a conjugated diene, particularly preferred 1,3-butadiene and optionally one or more further copolymerizable monomers, such as $\alpha,\beta$-unsaturated monocarboxylic or dicarboxylic acids, their esters or amides.

As $\alpha,\beta$-unsaturated monocarboxylic or dicarboxylic acids in such nitrile rubbers preference is given to fumaric acid, maleic acid, acrylic acid and methacrylic acid.

As esters of $\alpha,\beta$-unsaturated carboxylic acids in such nitrile rubbers preference is given to using their alkyl esters and alkoxyalkyl esters. Particularly preferred alkyl esters of $\alpha,\beta$-unsaturated carboxylic acids are methyl acrylate, ethyl acrylate, propyl acrylate, n-butyl acrylate, tert-butyl acrylate, propyl methacrylate, n-butyl methacrylate, tert-butyl methacrylate, 2-ethylhexyl acrylate, 2-ethylhexyl methacrylate and octyl acrylate. Particularly preferred alkoxyalkyl esters of $\alpha,\beta$-unsaturated carboxylic acids are methoxyethyl (meth)acrylate, ethoxyethyl(meth)acrylate and methoxyethyl(meth)acrylate. It is also possible to use mixtures of alkyl esters, e.g. those mentioned above, with alkoxyalkyl esters, e.g. in the form of those mentioned above.

A preferred terpolymer is a terpolymer of acrylonitrile, 1,3-butadiene and a third monomer selected from the group consisting of fumaric acid, maleic acid, acrylic acid, methacrylic acid, n-butyl acrylate, and tert-butyl acrylate.

The synthesis of the polymer can be undertaken in latex form. The polymers are in nanoparticles in the latex.

The synthesis process can be achieved with use of a chemical redox initiator, such as ammonium persulphate (APS). Further polymerisation initiators include thermal initiators such as potassium persulfate, dialkylperoxides or azocompounds and redox initiators, for example alkylhydroperoxides such as diisopropylbenzine, p-menthane and pinane hydroperoxides, optionally in combination with cholated salts and suitable reducing agent.

The initiator can be used in small quantities. An amount of APS with respect to the total monomers is in the range of 0.0.5% to 5%, preferably 0.1%-1% in weight based on the total amount of the monomers.

The synthesis process is preferred carried out with a surfactant, such as sodium dodecyl sulfate (SDS) and Gemini 16-3-16. The amount of the surfactant can be from about 0.1% to about 15%, preferably 0.1 to 1% in weight based on the total monomer amount used.

In a preferred embodiment water is used as the medium for the monomers. The amount of water is from about 2 times to about 30 times, preferably from 5 times to 10 times, in weight based on the amount of the monomers used.

The synthesis process can be undertaken in a suitable reactor equipped with temperature regulating and monomer feeding and agitating means.

Generally, the reaction temperature suitable for the present invention is from about 0° C. to about 100° C., preferably from about 15° C. to about 70° C.

According to a preferred embodiment, during the course of the reaction, the reaction time is from about 0.25 of an hour to about 100 hours, preferably from about 1 hour to 20 hours, depending on operational conditions.

According to a preferred embodiment, during the course of the reaction, the monomer feeding time is from about 0.25 of an hour to about 50 hours, preferably from about 1 hour to 10 hours, depending on operational conditions.

According to a preferred embodiment, during the course of the reaction, after the monomer feeding is finished, an aging time is preferred and it is from about one quarter of an hour to about 50 hours, preferably from about 1 hour to 10 hours, depending on operational conditions.

According to a preferred embodiment, when the reaction is complete, to the extent desired, the reaction vessel can be cooled (if applicable) and the polymer latex is obtained.

II) Hydrogenation

II.1 Catalysts

The metal atom of the catalyst is a transition metal, preferably a noble metal. In one preferred embodiment, the catalyst is a VIII-B metal of atomic number 44 to 76 including Ru and Os, especially Rh.

In a further preferred embodiment the catalyst is an organometallic catalyst comprising at least one organic ligand and a transition metal.

Preferred organometallic catalysts for the hydrogenation comprise the following compounds:

Cat 1

Compounds of the formula $L_nMX_2$ known from U.S. Pat. No. 3,454,644 wherein L is a complexing ligand, n is a whole number from 3 to 4 inclusive, M is a group VIII-A metal of atomic number from 44 to 76 inclusive, i.e. ruthenium to osmium and X is halogen. Preferred ligands L are olefins, phenols, thiophenols and more preferably a carbonyl ligand or a tertiary phosphine ligand.

In a further preferred embodiment divalent ruthenium catalysts of the formula $RuXY(CO)ZL_2$ or $RuX(NO)(CO)L_2$ known from U.S. Pat. No. 5,057,581 are preferred wherein X is a halogen atom or a carboxylate group, Y is a halogen atom, a hydrogen atom, a phenyl group, a carboxylate group, or a phenylvinyl group, Z is CO, pyridine, benzonitrile, trimethylphosphite and L is a phosphine ligand having at least one bulky alkyl substituent.

Cat 2

In a further preferred embodiment the organometallic catalyst is a catalyst combination known from U.S. Pat. No. 5,705,571 including at least one catalyst (A) and at least one catalyst (B), wherein the catalyst (A) is an unsubstituted or substituted bis(cyclopentadienyl) Group VIII transition metal compound, which is represented by the following formula:

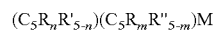

$(C_5R_nR'_{5-n})(C_5R_mR''_{5-m})M$ wherein

R, R' and R''
are the same or different and are selected from the group consisting of hydrogen, $C_1$-$C_8$ alkyl and alkoxy groups, $C_6$-$C_8$ aryl and aryloxy groups, $C_6$-$C_8$ cycloalkyl and cycloalkoxy groups, $C_1$-$C_5$ hydroxyalkyl groups, aldehyde groups, carboxyl groups, silyl groups.

m and n
are integers independently from 0 to 5,
$C_5R_nR'_{5-n}$ and $C_5R_mR''_{5-m}$
are the same or different unsubstituted or substituted cyclopentadienyl groups, M
is a Group VIII transition metal selected from the groups consisting of cobalt, nickel, rhodium, palladium, platinum and iridium,
wherein the catalyst (B) is an organic lithium compound having at least one lithium atom or is lithium hydride,
wherein the organic lithium compound is selected from the group consisting of R'''Li and R'''Li$_2$,
wherein R''' is a $C_1$-$C_{30}$ hydrocarbon moiety or a polymeric moiety,
wherein the molar ratio of lithium atom to M atom is from 0.1 to 100.

Cat 3

In a further preferred embodiment the organometallic catalyst is a catalyst comprising monocyclopentadienyl titanium compound represented by the following general formula I as main catalyst:

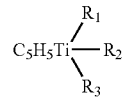

[I]

wherein $R_1$, $R_2$ and $R_3$ may be the same or different and are independently selected from the group consisting of halogen groups, $C_1$-$C_8$ alkyl groups, $C_1$-$C_8$ alkoxy groups, $C_6$-$C_{20}$ aryloxy groups, $C_6$-$C_{20}$ cycloalkyl groups, silyl groups, and carbonyl groups;

and an alkoxylithium compound represented by the following general formula II as cocatalyst:

$R_4O—Li$ (II)

wherein $R_4$ is a substitute group.

Cat 4

In a particularly preferred embodiment the hydrogenation process of the present invention can be achieved with use of a rhodium containing catalyst. Preferably the catalyst is of the formula:

$RhQL_x$ wherein Q is hydrogen or an anion, preferably a halide and more preferably a chloride or bromide ion wherein L is a ligand compound of the formula $R_mB$, wherein
R is a $C_1$-$C_8$-alkyl group, a $C_4$-$C_8$-cycloalkyl group a $C_6$-$C_{15}$-aryl group or a $C_7$-$C_{15}$-aralkyl group,
B is phosphorus, arsenic, sulfur, or a sulphoxide group, and
m is 2 or 3, preferably m is 2 when B is sulphur or sulphoxide, and m is 3 when B is phosphorus or arsenic, and wherein
x is 2, 3 or 4, preferable x is 3 when Q is halogen and preferably x is 4 when Q is hydrogen.

Preferred catalysts include tris-(triphenylphosphine)-rhodium(I)-chloride, tris(triphenylphosphine)-rhodium(III)-chloride and tris-(dimethylsulphoxide)-rhodium(III)-chloride, and tetrakis-(triphenylphosphine)-rhodium hydride, and the corresponding compounds in which triphenylphosphine moieties are replaced by tricyclohexylphosphine moieties. The catalyst can be used in small quantities. An amount in the range of 0.01 to 5.0% preferably 0.02% to 2.0% by weight based on the weight of the polymer solids content of the latex.

The catalyst can be used with a co-catalyst that is a ligand of formula $R_mB$, where R, m and B are as defined above, and m is preferably 3.

Preferably B is phosphorus, and the R groups can be the same or different. Thus, there can be used a triaryl, trialkyl, tricycloalkyl, diaryl monoalkyl, dialkyl monoaryl diaryl monocycloalkyl, dialkyl monocycloalkyl, dicycloalkyl monoaryl or dicycloalkyl monoaryl co-catalysts. Examples of suitable co-catalyst ligands are given in U.S. Pat. No. 4,631,315, the disclosure of which is incorporated by reference. The preferred co-catalyst ligand is triphenylphosphine. The co-catalyst ligand is preferably used in an amount in the range 0 to 5000%, more preferably 500 to 3000% by weight, based on the weight of catalyst. Preferably also the weight ratio of the co-catalyst to the rhodium-containing catalyst compound is in the range 0 to 50, more preferably in the range 5 to 30.

II.2 Hydrogenation Process

The hydrogenation process of the present invention is preferably carried out with essentially pure hydrogen gas at a pressure of from about 0.1 to about 20 MPa, preferably at a pressure of from about 1 to about 16 MPa.

The hydrogenation process of the present invention can be undertaken in a suitable reactor equipped with temperature regulating and agitating means. According to the present invention polymer latex can be fed into the reactor and degassed as required, the catalyst can then be added as a pure material or in some cases as a solution with a small amount of organic solvent and the reactor can then be pressurized with hydrogen or, in the alternative, the reactor can be pressurized with hydrogen and the catalyst added as a pure material or as a solution. Or, according to the present invention, the catalyst can be added as a pure material into reactor, and then the polymer latex can be fed into the reactor and degassed as required.

Generally, according to the present invention, it is preferred to heat the reactor device and the polymer latex before the catalyst is added. The hydrogenation temperature suitable for the present invention is from about 35° C. to about 180° C., preferably from about 80° C. to about 160° C.

During the course of the hydrogenation reaction of the present invention, the hydrogen may be added to the reactor.

The reaction time is from about one quarter of an hour to about 100 hours, depending on operational conditions. The extent to which the carbon-carbon double bonds in the polymer can be hydrogenated is from about 80 to about 99.5%, preferably from about 90 to about 99.5%.

When the hydrogenation reaction is complete to the extent desired, the reaction vessel can be cooled and vented. The resultant hydrogenated latex can be used in latex form if required or be coagulated and washed, to obtain the hydrogenated polymer in solid form.

In a preferred embodiment the resulting latex may be blended with additives known in the art for example an antioxidant and may be transferred to coagulation and washing vessels with sufficient agitation to prevent agglomeration. Subsequently, the product may be fed into a final dewatering device, pelletized, coated with a partitioning agent and transferred to suitable dryers.

Nanosized hydrogenated diene-based polymers according to the present invention can generally be used for the same technical applications as known latex particles with a higher particle size as rubber but showing improved properties, especially with respect to the resistance to degradation by heat, oxygen, and ozone. The invention is further illustrated but is not intended to be limited by the following examples in which all parts and percentages are by weight unless otherwise specified.

EXAMPLES

The materials which were used in the reaction and analysis are listed in Table 1.

TABLE 1

Specification of the Materials

| Material | Supplier |
|---|---|
| Potassium persulfate (KPS, 98% purity) | Aldrich Chemical Company |
| Sodium dodecyl sulfate (SDS, 95% purity) | Sigma-Aldrich Company |
| NBR latex | As described in the examples |
| Acrylonitrile | Aldrich Chemical Company |
| Butadiene | LANXESS Inc. |
| RhCl(PPh$_3$)$_3$ | Synthesized according to literature procedures (Osborn, J. A.; Jardine, F. H.; Young, J. F.; Wilkinson, G., *J. Chem. Soc. A.* 1966, 1711-1732) |
| Triphenylphosphine (99%) | Strem Chemicals |
| Hydrogen (99.999%) | Praxair |

The following Examples illustrate the scope of the invention and are not intended to limit the same.

Example 1

NBR Preparation:

0.2 g of APS, 2 g of Gemini 16-3-16, and 80 ml of water were put into a 300 mL stainless steel high-pressure reactor (Parr Instruments) equipped with a impeller stirrer, an addition tube and a thermal couple. After the temperature was raised to 70° C., the mixture of 2.5 ml of acrylonitrile and 7.5 ml of butadiene was added as small portions over a period of 60 min. After addition of the monomer mixture, an additional 20 min was applied before cooling to halt the reaction.

Hydrogenation Operation:

A 300 ml glass lined stainless steel autoclave having temperature control means, an agitator and hydrogen gas addition points was used. A latex of a butadiene-acrylonitrile polymer synthesized as above was used. The solid content in the latex was 13% by weight.

The mean diameter of the polymer particles in the latex was about 26 nm. 100 ml of such a latex, 0.13 gram of the catalyst RhCl(PPh$_3$)$_3$ and 1.3 gram of PPh$_3$ were charged into the reactor. The agitation speed was 600 rpm. The latex was then degassed with hydrogen. The temperature was increased to 160° C. and hydrogen pressure was raised up to 1000 psi (6.8 MPa). The reaction time was 0.25 hr. The hydrogenation degree was 43.2%.

The result indicates that when such synthesized latex of nanosized diene-based polymer particles, the hydrogenation speed can be significantly speeded up.

Example 2

The same procedures and reaction conditions as described in Example 1 were employed except the hydrogenation reaction time was 0.38 hr. 81.9% of hydrogenation degree was obtained.

Example 3

The same procedures and reaction conditions as described in Example 1 were employed except the hydrogenation reaction time was 1 hr. A hydrogenation degree of 91% was achieved.

The result indicated that within 1 hour the hydrogenation degree reached over 90%.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

The invention claimed is:

1. Latex particles comprising particles of hydrogenated acrylonitrile-butadiene polymer having a particle size measured as d$_{90}$-value of less than 30 nm, wherein the particles of hydrogenated acrylonitrile-butadiene polymer are prepared by a method comprising:
polymerizing at least acrylonitile and butadiene by continuously charging at least acrylonitrile and butadiene into a reactor containing an aqueous medium, a polymerization initiator, and a surfactant selected from sodium dodecyl sulfate or Gemini 16-3-16 to produce acrylonitrile-butadiene polymer particles, and
hydrogenating the polymer particles.

2. A process for the selective hydrogenation of unsaturated acrylonitrile-butadiene polymer particles in latex form, the process comprising:
combining unsaturated acrylonitrile-butadiene polymer particles having a particle size measured as d$_{90}$-value of less than 30 nm, with hydrogen or a hydrogen-source, in an aqueous medium comprising a transition metal containing catalyst, and a surfactant selected from sodium dodecyl sulfate or Gemini 16-3-16, to form a reaction mixture; and
maintaining a temperature of the reaction mixture at about 35° C. to about 180° C. to hydrogenate the polymer particles.

3. The process according to claim 2, wherein the particle size of the polymer particles measured as d$_{90}$-value is less than 20 nm.

4. The process according to claim 2, wherein the transition metal of the catalyst is a transition metal of atomic number from 44 to 77.

5. The process according to claim 2, wherein the transition metal of the catalyst is rhodium.

6. The process according to claim 2, wherein the catalyst corresponds to the formula

RhQL$_x$ wherein:
Q is hydrogen or an anion,
x is 2, 3 or 4, and
L is a ligand compound of the formula R$_m$B,
wherein:
R is a C$_1$-C$_8$-alkyl group, a C$_4$-C$_8$cycloalkyl group a C$_6$-C$_{15}$-aryl group or a C$_7$-C$_{15}$-aralkyl group,
B is phosphorus, arsenic, sulfur, or a sulphoxide group, and
m is 2 or 3.

7. The process according to claim 6, wherein:
when 8 is sulphur or sulphoxide, m is 2; and when B is phosphorus or arsenic, m is 3;
when Q is halogen, x is 3; and when 0 is hydrogen, x is 4; and
8 the hydrogenation is conducted at a temperature of about 80° C. to about 160° C.

8. The process according to claim 2, wherein the hydrogenation is carried out with essentially pure hydrogen gas at a pressure of 0.1 to about 20 MPa.

9. The process according to claim 2, wherein the unsaturated a acrylonitrile-butadiene polymer additionally comprises further copolymerizable monomers C.

10. The process according to claim 2, wherein the hydrogenation is conducted in a batch mode.

11. The process according to claim 2, wherein the hydrogenation is conducted in a continuous or semi-batch mode.

12. The latex particles according to claim 1, wherein the acrylonitrile-butadiene polymer comprises:
at least one butadiene selected from the group consisting of 1,3-butadiene, isoprene, 1-methylbutadiene, 2,3-dimethylbutadiene, and chloroprene; and
at least one of acrylonitrile and methacrylonitrile.

13. The latex particles according to claim 12, wherein:
the acrylonitrile-butadiene polymer comprises:
about 50 wt % to about 85 wt % of the butadiene; and
about 50 wt % to about 15 wt % of the acrylonitrile and/or methacrylonitrile.

14. The latex particles according to claim 12, wherein the particles have a d$_{90}$-value of less than 20 nm.

15. The latex particles according to claim 1, wherein the acrylonitrile-butadiene polymer comprises one of butadiene-acrylonitrile polymers, or butadiene-acrylonitrile-methacrylic acid polymers.

16. The latex particles according to claim 15, wherein the acrylonitrile-butadiene polymer has an acrylonitrile content of about 25 to about 45% by weight.

17. The latex particles according to claim 12, wherein the acrylonitrile-butadiene polymer additionally comprises at least one unsaturated carboxylic acid, esters thereof and/or amides thereof, wherein the carboxylic acids are selected from fumaric acid, maleic acid, acrylic acid and methacrylic acid.

18. The latex particles according to claim 17, wherein:
the particles have a $d_{90}$-value of less than 20 nm; and
the acrylonitrile-butadien polymer comprises:
  about 40 wt % to about 85 wt % butadiene;
  about 50 wt % to about 15 wt % of acrylonitrile and/or methacrylonitrile; and
  about 1 wt % to about 10 wt % of the unsaturated carboxylic acid, esters thereof and/or amides thereof.

\* \* \* \* \*